United States Patent [19]
Judd

[11] Patent Number: 5,716,444
[45] Date of Patent: Feb. 10, 1998

[54] NON-STICK LIQUID COMPOSITION FOR FOOD-CONTACTING COOKING SURFACES AND A METHOD OF USING THE COMPOSITION

[76] Inventor: Donald M. Judd, 201 Cricket Hill Rd., Columbia, S.C. 29223

[21] Appl. No.: 800,566

[22] Filed: Feb. 18, 1997

Related U.S. Application Data

[63] Continuation-in-part of Ser. No. 552,341, Nov. 2, 1995, abandoned.

[51] Int. Cl.$^6$ ............................ C09D 5/00; C09D 183/04
[52] U.S. Cl. ................... 106/287.16; 106/38.22
[58] Field of Search ........................... 106/287.16, 38.22

[56] References Cited

U.S. PATENT DOCUMENTS

| | | | |
|---|---|---|---|
| 3,615,826 | 10/1971 | Brill | 134/29 |
| 4,191,578 | 3/1980 | Carter | 106/1.13 |
| 4,544,692 | 10/1985 | Kuziemka | 524/361 |

*Primary Examiner*—David Brunsman
*Attorney, Agent, or Firm*—Thompson Hine & Flory, LLP

[57] ABSTRACT

A liquid composition for providing non-stick properties temporarily to food-contacting cooking surfaces consisting essentially of a reactive silicone fluid having a viscosity of about 11,000 to about 14,000 centistokes and a solvent and a method of using the composition to render cooking surfaces such as wire racks of grills and outdoor barbecues non-stickable.

21 Claims, No Drawings

NON-STICK LIQUID COMPOSITION FOR FOOD-CONTACTING COOKING SURFACES AND A METHOD OF USING THE COMPOSITION

This application is a continuation-in-part of U.S. application Ser. No. 08/552,341 filed Nov. 2, 1995 now abandoned.

BACKGROUND

The present invention relates to a liquid composition for providing non-stick properties temporarily to food-contacting cooking surfaces and a method for using the same, and more particularly, to a liquid composition for endowing discontinuous cooking surfaces that contact food such as wire racks of grills and outdoor barbecues, with non-stick properties.

One of the more undesirable tasks associated with outdoor barbecuing is the cleaning of the cooking surfaces, such as wire racks, after cooking food on them. Wire racks of grills and outdoor barbecues are subject to soiling by organic food deposits, especially baked-on organic food deposits as a result of cooking of the food. Wire racks and the like become charred and caked with unsightly deposits from food that has been cooked on the surfaces. These deposits are typically comprised of natural fats and other organic food deposits. These deposits are often converted into a polymeric mass in which part of the organic material is carbonized, thus giving the black, "caked" appearance.

These deposits are extremely difficult to remove from the cooking surfaces. The use of household soap and detergent solutions has little or no effect when applied with a cloth and/or kitchen brushes.

Prior art attempts at cleaning cooking surfaces such as broilers have used highly alkaline and strongly caustic compositions that required laborious scrubbing and scraping and required the user to wear rubber gloves. These attempts attacked the result of food being cooked or baked onto cooking surfaces as broilers and ovens rather than being a prevention approach.

Additional prior art attempts have tried to pre-treat the cooking surfaces such as broilers and ovens prior to cooking. U.S. Pat. No. 3,183,110 to Aler et al. teaches a coating composition comprising 2 to 7.5% dimethylpolysiloxane having a viscosity of between 20,000 to 50,000 centistokes for application to the surface of an oven or range to permit easy removal of spilled or spattered food particles. However, Aler et al. specifically teaches that concentrations in excess of about 7.5% dimethylpolysiloxane result in a greasy and difficult-to-remove coating.

U.S. Pat. No. 3,615,826 to Brill et al. discloses a process for cleaning ovens and like devices that consists of applying a composition which consists essentially of a polydimethylsiloxane having a viscosity of at least 3,000 centistokes at 25° C., a siloxane resin composed of $SiO_{4/2}$ and $(CH_3)_3SiO^{1/2}$, a metal oxide and the balance solvent. Due to the inclusion of siloxane resin in the composition, the composition has the effect of producing a relatively permanent coating. Further, the Brill reference teaches waiting 20–30 minutes after applying the composition to a clean and essentially dry oven prior to using the oven. It is believed that the "waiting period" is necessary to allow chemical crosslinking of the silicone resin to occur.

U.S. Pat. No. 3,196,027 to White et al. discloses the use of "film forming" siloxanes, more particularly, a dimethylpolysiloxane having a molecular weight for 400 centistokes viscosity in combination with methylene chloride as the solvent as a non-stick coating for interior oven surfaces and exterior of baking pans.

Accordingly, there is a need for a coating composition for cooking surfaces such as wire racks of grills and outdoor barbecues that can be applied in heavier coatings for endurance purposes, is a renewable temporary coating, is easily removable and which allows the cooking surfaces to be used (heated) immediately after application without waiting, or to already be in use at the time of application.

SUMMARY OF THE INVENTION

The present invention is a liquid composition for providing non-stick properties temporarily to food-contacting cooking surfaces comprising reactive silicone fluid and a solvent and a method for using the same, and more particularly, a liquid composition for endowing discontinuous cooking surfaces that contact food such as wire racks of grills and outdoor barbecues with non-stick properties.

In accordance with the present invention, a composition comprising a reactive silicone fluid and a solvent is applied to cooking surfaces such as wire racks of grills and outdoor barbecues to produce a non-stick, temporary coating. In addition, the present invention is a method of using the composition to render cooking surfaces non-stickable. Immediately after applying the composition, the cooking surface can be used (heated).

Preferably, the composition is in the form of a solution which can be applied by spraying onto the cooking surface from a pump-type container.

In another embodiment of the present invention, the composition further comprises a propellant. Preferably, the composition is in the form of an aerosol mist which can be generated from and by an aerosol can and be deposited on the cooking surface.

In yet another embodiment of the present invention, the composition is in the form of a liquid which can be deposited on the cooking surface by brushing, dabbing, wiping, pouring or any other conventional method of application.

Accordingly, it is an object of the present invention to provide a composition and a method in which a user can render cooking surfaces such as wire racks of grills and outdoor barbecues non-stickable, thus making cleaning of the cooking surfaces after cooking easier; and a method and composition for coating food-contacting surfaces which does not adversely affect the taste of the food being prepared on such surfaces.

Other objects and advantages of the present invention will be apparent from the following description and appended claims.

DETAILED DESCRIPTION

The combination of a reactive silicone fluid having a viscosity of about 11,000 to about 14,000 centistokes and a solvent produces a composition that when applied to cooking surfaces, such as wire racks of grills and outdoor barbecues, provides a non-obvious, easy-to-apply, pre-heating treatment that endows the cooking surfaces with temporary non-stick properties. Preferably, the composition may be applied to the cooking surfaces by generating and depositing a liquid or aerosol mist of the composition from a pump-type container or an aerosol can, or by brushing, dabbing, wiping or pouring.

The preferred reactive silicone fluid is a reactive silicone fluid commercially available under the name 1-9770 Release Additive from Dow Corning Corporation.

Conventionally, silicone resins were used to produce relatively permanent coatings to enhance release properties of cured clean or pigmented coatings as referenced by the Brill reference discussed above.

It has been found that a reactive silicone fluid can function as an effective temporary release agent in the absence of silicone resins and without curing the composition.

The composition of the present invention is typically applied to the cooking surface as a liquid prior to heating the cooking surface. However, the composition can also be applied to a heated cooking surface already in use. As a result of the composition comprising a lower viscosity reactive silicone fluid, heavier coatings can be applied without resulting in a greasy and more difficult to remove film. The heavier coatings result in the non-stick properties of the composition enduring more than one use. However, the non-stick properties of the composition are relatively temporary. Preferably, the user should apply the composition every 2 to 3 uses in order to maintain optimum non-stick properties.

After applying the composition to the cooking surface, the cooking surface can be heated and used immediately without any "waiting period."

In one particular embodiment of the present invention, the composition consists essentially of:

10-15% Reactive silicone fluid
and
85-90% Solvent
(all measurements % by volume).

Preferably, the reactive silicone fluid has a viscosity of from 11,000 to 14,000 centistokes. Preferably, the solvent comprises a combination of one or more substances selected from a group consisting of ketones and aromatic, aliphatic and chlorinated hydrocarbons. It is preferable that the composition is in the form of a solution which can be applied by spraying onto the cooking surface from a pump-type container.

In another embodiment of the present invention, the composition consists essentially of:

0.5-2% Reactive silicone fluid
40-50% Solvent
and
48-59.5% Propellant
(all measurements % by volume).

Preferably, the reactive silicone fluid has a viscosity of from 11,000 to 14,000 centistokes. Preferably, the solvent comprises a combination of one or more substances selected from a group consisting of ketones and aromatic, aliphatic and chlorinated hydrocarbons. The propellant is any common propellant, preferably propane. It is preferable that the composition is in the form of an aerosol mist which can be applied by spraying onto the cooking surface from an aerosol can.

In yet another embodiment of the present invention, the composition consists essentially of:

15-30% Reactive silicone fluid
and
70-85% Solvent
(all measurements % by volume).

Preferably, the reactive silicone fluid has a viscosity of from 11,000 to 14,000 centistokes. Preferably, the solvent comprises a combination of one or more substances selected from a group consisting of ketones and aromatic, aliphatic and chlorinated hydrocarbons. It is preferable that the composition is in the form of a liquid which can be applied by brushing, dabbing, wiping, pouring or any other conventional method of applying onto the cooking surface.

In another embodiment of the present invention, the method for rendering a cooking surface non-stickable comprises:

depositing a liquid composition consisting essentially of a reactive silicone fluid having a viscosity in the range of from about 11,000 to about 14,000 centistokes and a solvent on the cooking surface.

Preferably, the composition consists essentially of 10% to 15% by volume reactive silicone fluid and 85% to 90% by volume solvent.

It is preferable that the liquid composition is deposited onto the cooking surface by spraying the liquid composition in the form of a liquid mist generated from and by a pump-type container. Preferably, the cooking surface is one that contacts food such as wire racks of grills and outdoor barbecues.

Alternatively, the liquid composition consists essentially of 15% to 30% volume reactive silicone fluid and 70% to 85% by volume solvent. It is preferable that the liquid composition is deposited onto the cooking surface by brushing, dabbing, wiping, pouring or applying the liquid composition by any other conventional method known in the art.

Preferably, the solvent comprises a combination of one or more substances selected from a group consisting of ketones and aromatic, aliphatic and chlorinated hydrocarbons.

In yet another embodiment of the present invention, the method for rendering a cooking surface non-stickable comprises:

depositing a liquid composition consisting essentially of a reactive silicone fluid having a viscosity in the range of from about 11,000 to about 14,000 centistokes, a solvent and a propellant on the cooking surface.

Preferably, the liquid composition consists essentially of 0.5% to 2% by volume reactive silicone fluid, 40% to 50% by volume solvent and 48% to 59.5% by volume propellant. Preferably, the solvent comprises a combination of one or more substances selected from a group consisting of ketones and aromatic, aliphatic and chlorinated hydrocarbons. Preferably, the propellant is propane. It is preferable that the liquid composition is deposited onto the cooking surface by spraying the liquid composition in the form of an aerosol mist generated from and by an aerosol can. Preferably, the cooking surface is one that contacts food such as wire racks of grills and outdoor barbecues.

Having described the invention in detail, it will be apparent that modification and variations are possible without departing from the scope of the invention as defined in the following claims.

What is claimed is:

1. A liquid composition for providing non-stick properties temporarily to food-contacting cooking surfaces consisting essentially of a reactive silicone fluid having a viscosity of from about 11,000 to about 14,000 centistokes and a solvent.

2. The composition of claim 1 wherein the composition further includes a propellant.

3. The composition of claim 2 wherein the composition comprises about 0.5% to 2% by volume reactive silicone fluid about 40% to 50% by volume solvent and about 48% to 59.5 % by volume propellant.

4. The composition of claim 3 wherein the composition is in the form of an aerosol mist.

5. A liquid composition for providing non-stick properties temporarily to food-contacting cooking surfaces consisting essentially of a reactive silicone fluid having a viscosity of from about 11,000 to about 14,000 centistokes and a solvent, wherein the composition comprises about 10% to 15% by volume reactive silicone fluid and about 85% to 90% by volume solvent.

6. The composition of claim 6 wherein the composition is in the form of a solution.

7. A liquid composition for providing non-stick properties temporarily to food-contacting cooking surfaces consisting essentially of a reactive silicone fluid having a viscosity of from about 11,000 to about 14,000 centistokes and a solvent, wherein the composition comprises about 15% to 30% by volume reactive silicone fluid and about 70% to 58% by volume solvent.

8. A liquid composition for providing non-stick properties temporarily to food-contacting cooking surfaces consisting essentially of a reactive silicone fluid having a viscosity of from about 11,000 to about 14,000 centistokes and a solvent, wherein the composition further includes a propellant made of propane, wherein the composition comprises about 0.5% to 2% by volume reactive silicone fluid about 40% to 50% by volume solvent and about 48% to about 59.5% by volume propellant.

9. A liquid composition for providing non-stick properties temporarily to food-contacting cooking surfaces consisting essentially of a reactive silicone fluid having a viscosity of from about 11,000 to about 14,000 centistokes and a solvent, wherein the solvent comprises mineral spirits.

10. The composition of claim 9 wherein the solvent comprises a combination of one or more substances selected from a group consisting of ketones and aromatic, aliphatic and chlorinated hydrocarbons.

11. A method of rendering a food-contacting cooking surface non-stickable comprising:

depositing a liquid composition consisting essentially of a reactive silicone fluid having a viscosity in the range of from about 11,000 to about 14,000 centistokes and a solvent on the cooking surface.

12. The method of claim 11 wherein the composition comprises about 10% to 15% by volume reactive silicone fluid and about 85% to 90% by volume solvent.

13. The method of claim 12 wherein the composition is deposited onto the cooking surface as a liquid mist generated from and by a pump-type container.

14. The method of claim 11 wherein the composition comprises 15% to 30% by volume reactive silicone fluid and 70% to 58% by volume solvent.

15. The method of claim 14 wherein the composition is deposited onto the cooking surface by brushing, dabbing, wiping, pouring or any other conventional method.

16. The method of claim 11 wherein the composition further includes a propellant.

17. The method of claim 16 wherein the composition comprises about 0.5% to 2% by volume reactive silicone fluid, about 40% to 50% by volume solvent and about 48% to 59.5% by volume propellant.

18. The method of claim 16 wherein the propellant comprises propane.

19. The method of claim 16 wherein the composition is deposited onto the cooking surface as an aerosol mist generated from and by an aerosol can.

20. The method of claim 11 wherein the solvent comprises odorless mineral spirits.

21. The method of claim 20 wherein the solvent comprises a combination of one or more substances selected from a group consisting of ketones and aromatic, aliphatic and chlorinated hydrocarbons.

* * * * *